United States Patent

Perlman

[15] 3,644,917
[45] Feb. 22, 1972

[54] SINGLE TERMINAL ELECTRO-OPTICAL INTRUDER DETECTION DEVICE

[72] Inventor: David E. Perlman, Rochester, N.Y.
[73] Assignee: Detection Systems, Inc., East Rochester, N.Y.
[22] Filed: Sept. 18, 1969
[21] Appl. No.: 858,927

[52] U.S. Cl. .................340/258 B, 340/258 R, 250/217 SS
[51] Int. Cl. .........................................................G08b 17/10
[58] Field of Search ...............340/258 B, 258 R, 261, 228 S, 340/228, 258 C, 248 A; 250/217 SS, 221; 325/371, 377, 473, 474

[56] References Cited

UNITED STATES PATENTS

| | | | |
|---|---|---|---|
| 2,730,896 | 1/1956 | Boisblanc | 340/261 UX |
| 3,111,657 | 11/1963 | Bagno | 340/258 |
| 3,167,739 | 1/1965 | Girard et al. | 340/258 X |
| 3,198,952 | 8/1965 | Benham et al. | 340/228 X |
| 3,314,066 | 4/1967 | Schwartz et al. | 340/258 UX |
| 3,465,339 | 9/1969 | Marner | 340/248 |

OTHER PUBLICATIONS

F. F. Morehead, Jr., Light Emitting Semiconductors, Scientific American, May 1967, page 109, Group 250.

Primary Examiner—Donald J. Yusko
Assistant Examiner—Michael Slobasky
Attorney—Warren W. Kurz

[57] ABSTRACT

An improved single terminal electric eye including a modulated luminous diode as a source of radiant energy and an alarm-activating circuit for detecting any variation, above or below a steady-state level, in reflected energy incident upon the transducing element of the electric eye. The alarm-activating circuit comprises a pair of averaging circuits connected in series and a comparator, connected to the outputs of the averaging circuits, which transmits an alarm-activating signal whenever the outputs of the averaging circuits differ. When the transducer is subjected to constant modulated illumination, the outputs of the averaging circuits are at the same steady-state level. When, however, the illumination increases or decreases, the outputs of the averaging circuits tend to follow at different rates, thereby providing an unbalanced input to the comparator whereby an alarm signal may be transmitted.

8 Claims, 5 Drawing Figures

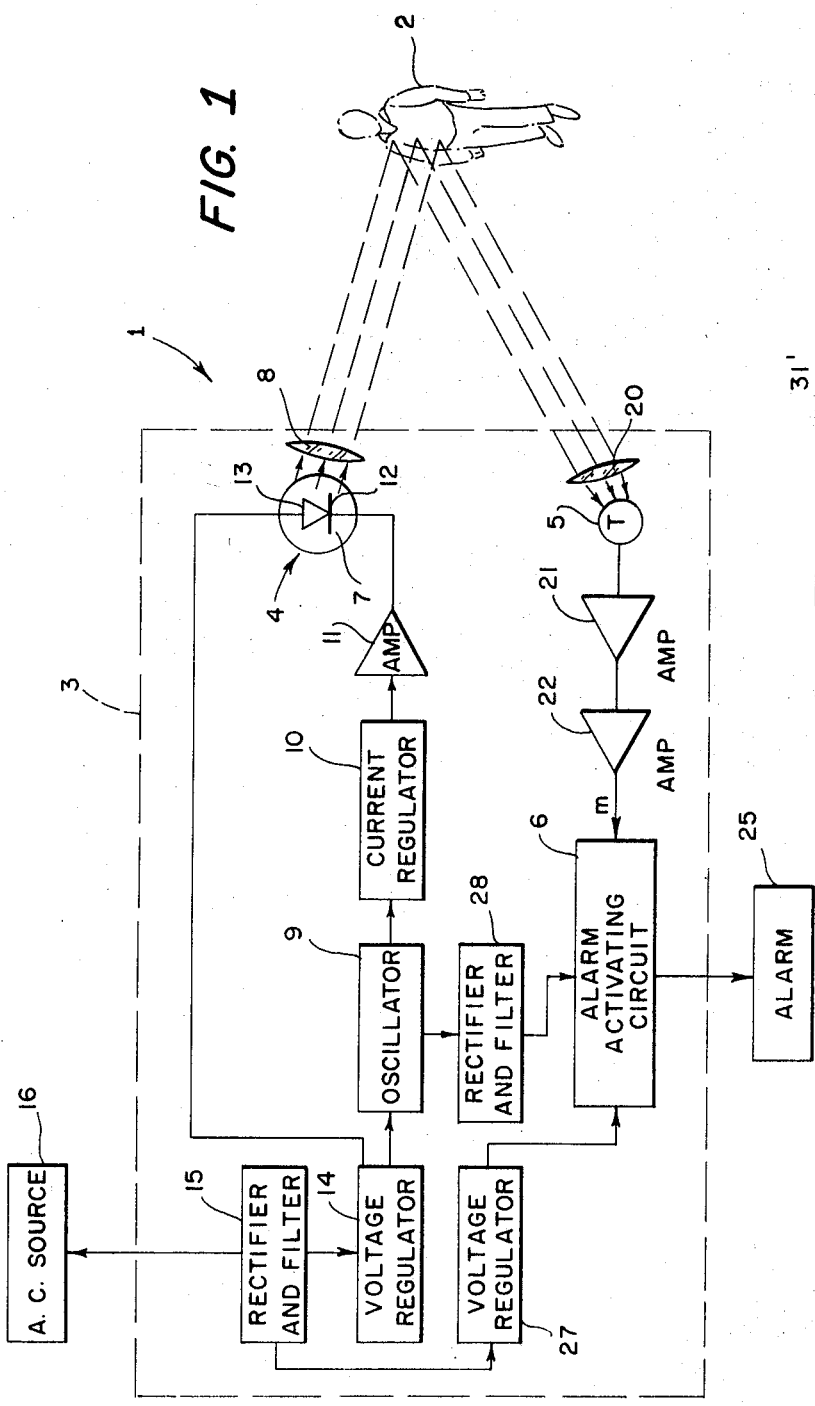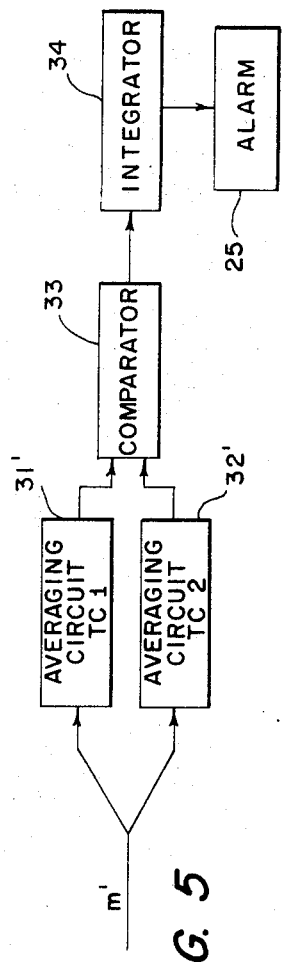

INVENTORS
DAVID E. PERLMAN

BY  Warren W. Kurz
AGENT

SINGLE TERMINAL ELECTRO-OPTICAL INTRUDER DETECTION DEVICE

BACKGROUND OF THE INVENTION

1. Field of the Invention

The present invention relates to improvements in intruder detection devices of the electric eye variety.

2. Description of the Prior Art

Conventional electric eyes employed for the purpose of intruder detection generally comprise: (a) a transmitter of a beam of radiant energy; (b) a transducer which is electrically responsive to the energy provided by the transmitter and is capable of providing an electrical output proportional to the quantity of energy incident thereon; and (c) an alarm-activating circuit which is electrically coupled with the transducer output and is energizable when the output changes in such a manner as to be indicative of a sudden decrease in energy incident upon the transducer.

The most common arrangement of the electric eye transmitting and transducing elements is, of course, that arrangement wherein such elements are positioned on opposite sides of an area to be protected from intrusion, with the transducing element situated so as to intercept the beam of energy provided by the transmitter. By this arrangement, the presence of an intruder is readily detectable if, in some manner, he causes an interruption in the beam, for such an interruption will cause the magnitude of energy incident on the transducer to suddenly decrease below the predetermined level at which the output of the transducer will energize the alarm-activating circuit.

A less common arrangement of the electric eye transmitting and transducing elements is one in which such elements are mounted adjacent to each other in a common housing and the energy beam is directed at a surface on the opposite side of the area to be protected, which surface is capable of reflecting a portion of the transmitted beam of energy back to the transducing element. Here again, intrusion is detectable when the reflected energy incident on the transducer is caused to drop below a predetermined level by the passage of the intruder through a portion of the beam. This arrangement is commonly known as a "single terminal" electric eye.

Although the single terminal electric eye possesses many obvious advantages over the more conventional "dual terminal" arrangement, (e.g., portability, relative ease of installation, versatility, etc.), it suffers a substantial disadvantage in that it is readily foilable. Since conventional single terminal electric eyes, like the more conventional dual terminal devices, operate on a signal "dropout" principle, the alarm-activating circuits associated therewith are not normally energizable until the reflected energy incident upon the transducing element drops below a predetermined level. Thus, if the reflectivity of the intruder or his clothing is such as to reflect sufficient energy upon the transducing element as to cause its output to remain above the triggering level of the alarm-activating circuit, his presence in the protected area will remain undetected. Moreover, a wary intruder who is aware of the presence of an electric eye may readily escape detection by simply short-circuiting the path of the energy beam by inserting a mirror or the like in close proximity with the electric eye housing and thereby cause the energy at the transducing element to remain above the triggering level. In this manner, the intruder may gain access to that portion of the protected area to the rear of the mirror.

Another disadvantage of using conventional single terminal electric eyes is the necessity of using a reflecting surface in combination therewith. Without a reflecting surface, no energy from the transmitter will be returned to the transducer and, therefore, the presence of an intruder will not effect a decrease in energy on the transducer. Thus, if reflecting surface is unavailable in the area to be protected, a conventional single terminal electric eye cannot be utilized. Moreover, even when a reflecting surface is available, the electric eye must be, at all times, properly aligned therewith. Otherwise, insufficient energy may be reflected upon the transducer to detect an interruption of the energy beam by the passage therethrough of an intruder.

Still another disadvantage of conventional electric eyes, both single and dual terminal types, is that they commonly employ a heated filament lamp as a source of radiant energy. In order to discriminate against background radiation it is often necessary to modulate the output of the energy source at a high frequency. Because of the comparatively slow temperature decay of heated filaments, it is impractical to electrically modulate the output of heated filament lamps at a high frequency. To do so, would result in a modulated signal having a small peak-to-peak amplitude. Thus, the alternative approach, mechanical modulation, is often employed, and this tends to be costly due to the necessity of employing an electric motor for driving a reticle or the like in front of the energy source. Moreover, such apparatus often requires a significant amount of space which, in turn, requires the electric eye housing to be of substantial size. Furthermore, insofar as heated filament lamps are concerned, such sources have the disadvantages of having a relatively short life and of requiring relatively high power input. Such disadvantages obviously detract from the reliability of the system in which they are employed and add to the expense of operation.

SUMMARY OF THE INVENTION

It is therefore a principal object of the present invention to provide a novel and improved single terminal electric eye.

Another object of this invention is to provide a single terminal electric eye which is more reliable than those presently available.

Still another object of this invention is to provide a single terminal electric eye which is capable of properly operating with and without a reflecting surface.

A further object of this invention is to provide a single terminal electric eye which is capable of activating an alarm in response to the sensing of an increase, as well as a decrease, in reflected energy incident upon the transducing element.

A still further object of the present invention is to provide an electronic control circuit for use in electric eye detection apparatus which is simple in construction and dependable in performance.

Yet another object of the present invention is to provide a compact single terminal electric eye having a source of radiant energy which may be electrically modulated at high frequency for background discrimination purposes.

In accordance with the present invention, it has been found that the foregoing objects can be accomplished by providing a single terminal electric eye which generally comprises a luminous diode radiant energy source; an electronic oscillator for modulating the output of the diode at high frequency; a transducer which is sensitive to energy emitted by the diode and is arranged to receive reflected energy from objects which have been illuminated by the modulated energy provided by the diode; a background discriminating amplifier, connected with the output of the transducer and sharply tuned to pass a signal only of the modulation frequency; and an alarm-activating circuit which is electrically coupled to the output of the tuned amplifier and is capable of producing an alarm-activating signal whenever the output of the amplifier increases or decreases a predetermined amount with respect to a steady-state level. The alarm-activating circuit comprises a pair of averaging circuits, electrically arranged in series and preferably having differing time constants, and a comparator circuit which is electrically coupled with the outputs of the averaging circuits and is capable of producing an alarm-activating signal whenever the outputs of the averaging circuits differ.

A preferred embodiment of the invention has been chosen for the purpose of illustration and description and is shown in the accompanying drawings, brief descriptions of which are provided below.

BRIEF DESCRIPTION OF THE DRAWINGS

FIG. 1 is a schematic block diagram of an electric eye circuit in accordance with a preferred embodiment of the invention;

FIG. 5 is a schematic block diagram illustrating circuit components of the alarm-activating circuit of FIG. 1 according to another embodiment.

DESCRIPTION OF PREFERRED EMBODIMENTS

Figure 2:
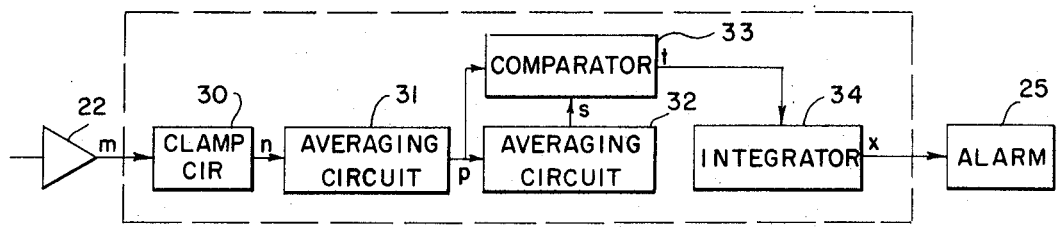
FIG. 2 is a schematic block diagram illustrating the circuit components of the alarm-activating circuit of FIG. 1.

Referring now to FIG. 1, a single terminal electric eye 1 for detecting the presence of an intruder 2 in a space under surveillance by such device is shown in accordance with a preferred embodiment of the invention. The electric eye comprises a housing 3 having disposed therein a transmitter 4 of electromagnetic radiation, a transducer 5 which is sensitive to the radiation provided by the transmitter 4 and capable of producing an electrical signal of a magnitude proportional to the magnitude of such radiation which is incident on the sensitive surface thereof, and an alarm-activating circuit 6 which is electrically coupled with the output of the transducer 5.

Preferably, the transmitter comprises a luminous or light-emitting diode 7 (e.g., gallium-arsenide or silicon carbide diodes) and a lens 8 which serves to direct energy from the source outwardly from the housing 3 and through a space which is under surveillance by the electric eye. Luminous diodes are ideal for use in electric eyes because of their relatively small size and ability to be modulated at electronic speeds. Gallium arsenide luminous diodes are preferable because of their ability to emit infrared radiation which is, of course, undetectable by the human eye, therefore, an intruder would be unable to determine the direction in which the electric eye is aimed, even if he were aware of its presence. Luminous diode 7 is energized and square wave modulated by a conventional circuit which includes a multivibrator oscillator 9, a current regulator 10 and a power amplifier 11 which is connected in series with the cathode 12 of the luminous diode. Regulated voltage is provided to the diode energizing and modulating circuit and to the anode 13 of the luminous diode by a voltage regulator 14 which receives the direct current output of a rectifying and filtering circuit 15 which, in turn, is connected with a conventional alternating current source 16.

Transducer 5 preferably comprises silicon photodiode which is arranged in the housing in such manner as to receive radiant energy which has been transmitted by transmitter 4 and reflected by objects in the space under surveillance. A lens 20 serves to provide optical gain by condensing reflected energy upon the radiation sensitive surface of the transducer. The output of the transducer is then amplified by a conventional preamplifier 21 and the output thereof is then passed through a sharply tuned amplifier 22 which is tuned for the frequency of modulation provided by oscillator 9. The output $m$ of tuned amplifier 22 serves as the input to the alarm-activating circuit 6, described hereinafter, which activates an alarm 25 when the output $m$ varies in a predetermined manner above or below its long term or steady-state average value. The alarm-activating circuit 6 is energized by positive voltage from a second voltage regulator 27 connected with an output of the rectifying and filtering circuit 15, and is provided with a negative reference voltage from oscillator 9 through the rectifying and filtering circuit 28, the negative voltage serving to enhance the output of circuit 6 when input $m$ decreases from a preexisting low value.

Figure 3:
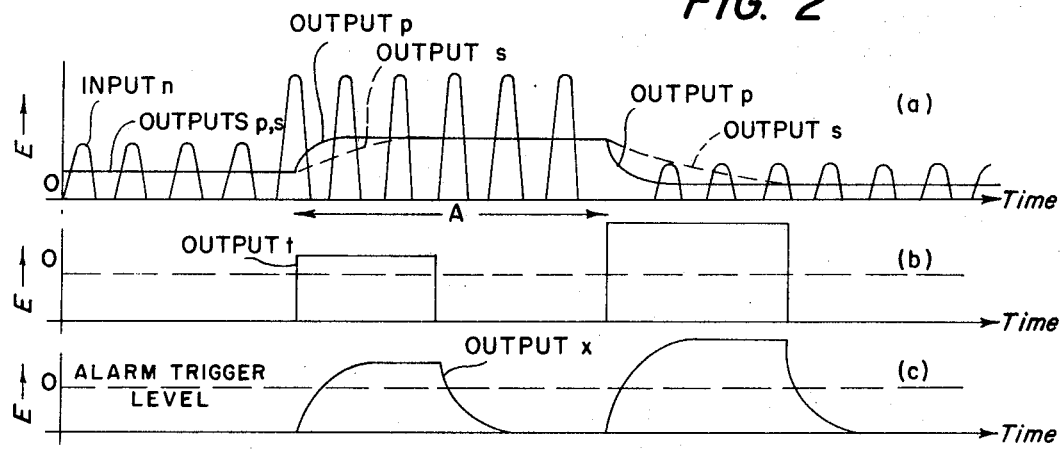
FIG. 3 is series of graphs illustrating the outputs of circuit components of the alarm-activating circuit as the input thereto varies with time.

In FIG. 2, the components of the alarm-activating circuit 6 are shown schematically. Output $m$ of the tuned amplifier 22 is first fed through a conventional clamping circuit 30, commonly referred to as a "DC restorer," whereby the sine wave output of the tuned amplifier may be clamped to zero volts so that its full peak-to-peak amplitude can be detected. Because of the normal distortion associated with clamping circuits, the lower portion of the sine wave input will be clipped off by clamping circuit 30 and its output $n$ will be as shown in the graph (a) of FIG. 3.

The clamping circuit output serves as the input $n$ to a pair of averaging circuits 31 and 32 which are connected in series. Averaging circuit 31 serves to average its clipped sine wave input $n$ and provide an output $p$ which is proportional to the average value thereof. It should be noted that, due to the inherently long time constant of averaging circuits in general, output $p$ of averaging circuit 31 will substantially lag any rapid changes in input. Thus, as illustrated in graph (a) of FIG. 3 wherein input $n$ is shown to suddenly increase for a time period A and then suddenly decrease, output $p$ will always assume a level equal to the average value of its input, but will assume such level at a much slower rate than that at which the input changes. Output $p$ is then fed to the input of the second averaging circuit 32 which, again, averages its input and provides an output $s$ proportional thereto; thus, circuit 32 averages the average value of input $n$. Obviously, when input $n$ is constant, outputs $p$ and $s$ are identical. However, when input $n$ changes to a new level, thereby causing output $p$ to slowly change to a new level, output $s$ will follow the change in output $p$ but, again, at a slower rate. As best shown in graph (a) of FIG. 3, when input $n$ is constant, outputs $p$ and $s$ are identical; when input $n$ changes to a new level, outputs $p$ and $s$ change accordingly, but at different rates.

Outputs $p$ and $s$ of averaging circuits 31 and 32, respectively, serve as the inputs to a comparator circuit 33. Comparator 33 is capable of providing an output $t$ whenever there is a difference in inputs exceeding a predetermined amount, output $t$ having a magnitude related to the initial magnitude of signal $n$ and a duration substantially equal to the duration of the difference in inputs. Whenever the inputs to comparator 33 are identical or sufficiently close as to be below the threshold at which an output signal may be generated, output $t$ is zero. See graph (b) of FIG. 3.

Whenever output $t$ of comparator 33 is present, it is fed to an integrating circuit 34 which serves as a means to discriminate against false triggering of the alarm 25 due to rapid transients in the circuit. Integrator 34, having a relatively slow time constant, will gradually accumulate the output signal of comparator 33 and provide an output $x$ proportional to the accumulated signal. When the accumulated output exceeds a predetermined level, alarm 25 will be activated. Note, circuit transients may cause comparator 33 to transmit a signal of high magnitude, but short duration. Such a signal would not cause triggering of the alarm because of the slow response of the integrator.

To summarize the operation of the electric eye described hereinabove with reference to its utility as an intruder-detecting device, the electric eye housing is simply positioned such that a beam of modulated energy may be directed through the space to be protected and is electrically energized from a conventional source. There is no necessity, as in conventional devices, of directing the beam toward a reflecting surface whereby energy may be returned to the transducing element in order to establish a reference level. If there happens to be a reflecting surface (e.g., a wall) on the opposite side of the protected area, the electric eye of the invention will adapt itself to use the energy reflected thereby as reference level and will detect any increase or decrease in such level effected by the intruder. Assuming the intruder absorbs more energy than he reflects, as is usually the case, then input $n$ will decrease, causing outputs $p$ and $s$ of averaging circuits to follow at different rates. Until outputs $p$ and $s$ are stabilized at a level indicative of the decreased energy incident on transducer 5, comparator 33 will transmit a signal to integrator 34 which, in turn, will accumulate such signal and activate the alarm 25 when the accumulated signal surpasses a predetermined level. Assuming the intruder reflects more of the energy provided by transmitter 4 than he reflects, thereby causing an increase of energy on transducer 5, then input $n$ will increase, causing outputs $p$ and $s$ of the averaging circuits to follow at different rates. Again, an alarm activating signal will be provided until outputs $p$ and $s$ stabilize at the new level. If there happens to be no reflecting surface at which the electric eye may be directed, then the electric eye of the invention will adapt itself to use zero energy as the reference level. Whenever the transducer senses any increase in energy, as might be caused by the intruder's passing through the beam and reflecting energy back to the transducer, the averaging circuits respond, at different rates, to the increase in signal and an alarm-activating signal is generated by the comparator until the outputs of the averaging circuits stabilize.

Figure 4:
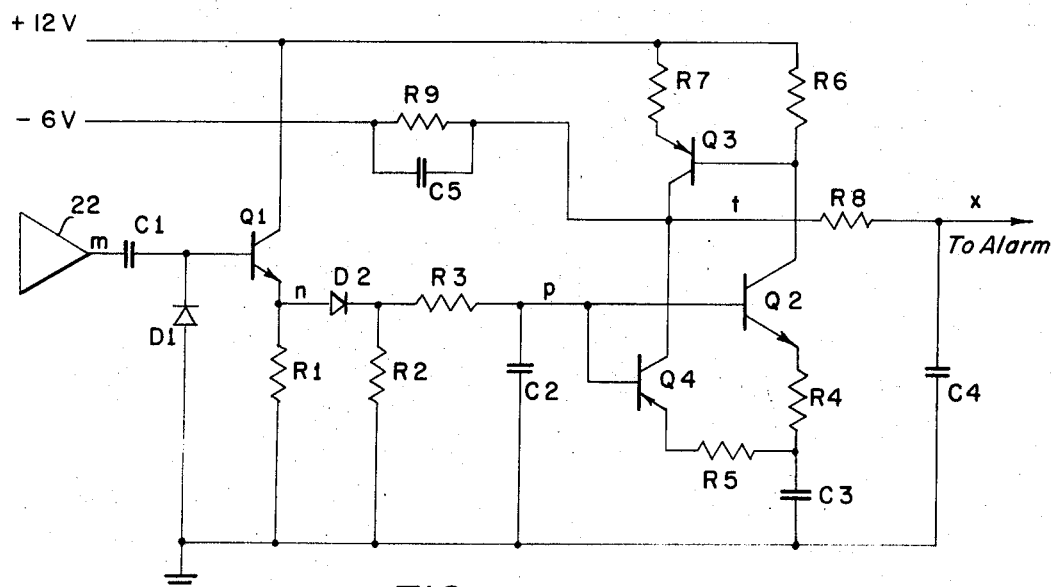
FIG. 4 is an electrical schematic diagram of the alarm-activating circuit of FIG. 2.

A preferred circuit for accomplishing the aforedescribed functions of alarm-activating circuit 6 is illustrated in the electrical schematic diagram of FIG. 4. As shown, the output $m$ of tuned amplifier 22 is fed into the clamping circuit 6, comprising capacitor C1 and diode D1, which clamps the negative-going peaks of the sinusoidal input to zero volts. The output of the clamping circuit is isolated from the following circuitry by the emitter-follower comprising transistor Q1 and its load resistor R1. The output $n$ of emitter follower Q1 is then fed into the first averaging circuit 31 comprising diode D2, and resistors R2 and R3, and capacitor C2. Resistor R2 provides a discharge path for C2, thereby permitting C2 to follow decreases in the input signal. The voltage accumulated across capacitor C2 will be proportional to the average value of the input to the averaging circuit. The output $p$ of averaging circuit 31 is then fed to the input of the second averaging circuit 32 via the emitter of transistor Q2. The second averaging circuit 32 comprises resistors R4 and R5 and capacitor C3. Voltage from a 12-volt supply (voltage regulator 27) is accumulated across C3 which charges through resistor R4 via transistor Q2 and resistor R6. When the voltage across capacitor C3 reaches the voltage across capacitor C2, transistor Q2 stops conducting and the outputs of averaging circuits 31 and 32 are substantially identical. The comparator circuit 33 comprises transistor Q2 (which serves the dual role of charging capacitor C3 when signal $p$ increases and also passes the presence of such increases on to the output $t$) transistors Q3 and Q4 and resistors R6, R7, and R9. The integrator 34 comprises resistor R8 and capacitor C4.

The elements of the alarm-activating circuit function in the following manner: when the voltages across C2 and C3 are substantially the same, thereby indicating a constant steady-state input from tuned amplifier 22, transistors Q2, Q3 and Q4 are cut off due to the absence of forward bias and the output $x$ of the alarm-activating circuit is −6 volts. A negative voltage is preferred because it provides for increased output swing when the input to the circuit is decreased from a preexisting low level. When the input from tuned amplifier 22 decreases, the voltage across capacitor C2 discharges proportionally through resistor R2, thereby causing the voltage across capacitor C3 to exceed that across C2. When the voltage across C3 exceeds that across C2, an unbalance is created in the circuit and transistor Q4 becomes forward biased and conducts until capacitor C3 discharges through resistor R5 to such an extent that the voltages across C2 and C3 are again substantially equal. Conduction of transistor Q4 causes a positive-going voltage to be developed across load resistor R9 which is then fed through resistor R8 to capacitor C4 which integrates it until the accumulated charge exceeds the triggering level of a relay drive circuit comprising alarm 25. When the input from tuned amplifier 22 increases, the voltage across capacitor C2 increases proportionally, thereby causing an unbalance with the voltage across capacitor C3. When the voltage across capacitor C2 exceeds that across capacitor C3, transistors Q2 and Q3 conduct and capacitor C3 charges via resistor R4 to approximately the same level as capacitor C2. Until capacitor C3 is charged to the same level as capacitor C2, a signal is passed by transistor Q2, through its load resistor R6. The voltage drop across R6 causes transistor Q3 to conduct. Resistor R7 serves to reduce the gain of transistor Q3 so that the overall sensitivity to signal increases does not exceed that of signal decreases. Transistor Q3 functions as an inverter so as to cause a voltage increase to appear across the output load resistor R9. Thus, the integrating circuit receives a positive-going input, notwithstanding the direction of change in input to the alarm-activating circuit. Capacitor C5 serves to suppress unwanted brief transients thereby acting as a prefilter for integrator 34.

In FIG. 5, there is schematically illustrated an alternate arrangement of the averaging circuits comprising the alarm-activating circuit 6. As shown, the averaging circuits, 31' and 32' are arranged in parallel, as contrasted with the series arrangement of the preferred embodiment. In a parallel arrangement, it is necessary that the time constants, TC1 and TC2, of the averaging circuits be different, otherwise there would be no difference in inputs to comparator 33 thereby preventing the transmission of an alarm signal.

Although the single terminal electric eye of the present invention has been described with particular reference to its application in intruder detection, it should be understood that the invention has equal utility in all fields wherein a change in condition may be detected by a change in reflected energy at the electric eye terminal. Moreover, it is apparent that the apparatus, and particularly the detailed circuit elements thereof, may be varied without departing from the spirit and scope of the invention as defined in the appended claims.

I claim:

1. A single terminal photoelectric intruder detection device comprising:

a housing; means disposed on said housing for transmitting a beam of electromagnetic radiation through a region wherein intrusion is to be detected, said transmitting means comprising a luminous diode;

means for electronically modulating the output of said luminous diode;

radiation-sensitive means disposed on said housing to receive said radiation upon being reflected by objects in said beam, said radiation-sensitive means comprising a photo diode which is responsive to said radiation to provide an electrical output signal having an amplitude proportional to the intensity of radiation received thereby; and means, operatively coupled with said electrical output signal, for transmitting an alarm-activating signal in response to a predetermined increase or decrease in amplitude of said electrical output signal occurring at a rate in excess of a predetermined value and lasting for a predetermined time.

2. A single terminal photoelectric intruder detection device comprising a housing, a luminous diode disposed on said housing, electronic means for periodically energizing said luminous diode to cause modulated radiant energy, at a predetermined frequency, to emanate therefrom, means for directing said energy through a space wherein intrusion is to be detected, a photo diode disposed on said housing to be illuminated by said energy upon being reflected by objects in the space wherein intrusion is to be detected, said photo diode being responsive to said energy to produce an electrical output signal having an amplitude proportional to the level of illumination received thereby, and circuitry for activating an alarm in response to a predetermined increase or decrease in amplitude of said electrical output signal, said increase or decrease occurring at a rate in excess of a predetermined value and lasting for a predetermined time.

3. The invention according to claim 2 further comprising a tuned amplifier tuned for said predetermined frequency and having an input connected with said electrical output signal.

4. The invention according to claim 3 wherein said alarm-activating circuitry comprises a first averaging circuit having an input connected with said electrical output signal, a second averaging circuit having an input connected with the output of said first averaging circuit, and a comparator circuit connected with the outputs of said first and second averaging circuits for providing an alarm-activating signal in response to a predetermined difference in amplitude of the outputs of said first and second averaging circuits.

5. A single terminal photoelectric intruder detection device comprising a housing, a luminous diode disposed on said housing, means for energizing said luminous diode to cause radiant energy to emanate therefrom, means for directing said energy through a space wherein intrusion is to be detected, a photo diode disposed on said housing to be illuminated by said energy upon being reflected by objects in the space wherein intrusion is to be detected, said photo diode being responsive to said energy to produce an electrical output signal having an amplitude proportional to the level of illumination received thereby, and circuitry for activating an alarm in response to a predetermined increase or decrease in amplitude of said electrical output signal, said increase or decrease occurring at a rate in excess of a predetermined value and lasting for a predetermined time, said alarm-activating circuitry comprising first and second averaging circuits connected in parallel, each of said averaging circuits having a time constant different from that of the other and an input connected with said electrical output signal; and a comparator circuit operatively coupled with the outputs of said averaging circuits and adapted to provide an alarm activating signal when the difference in amplitude of the respective averaging circuit outputs exceeds a predetermined value.

6. Electric eye detection apparatus comprising means for transmitting a beam of radiant energy through a space to be monitored, transducing means responsive to said radiant energy and capable of providing an electrical output signal proportional to the level of said energy incident thereon, said transducing means being arranged to receive energy from said beam which has been reflected by objects in said space, an alarm, and an alarm-actuating circuit comprising a first averaging circuit operatively coupled with the output of said transducing means output, a second averaging circuit having its input operatively coupled with the output of said first averaging circuit, and a comparator circuit operatively coupled with the outputs of said first and second averaging circuits and adapted to provide an alarm activating output signal in response to a predetermined difference in output from said averaging circuits.

7. The invention according to claim 6 wherein said energy-transmitting means comprises a luminous diode.

8. The invention according to claim 6 wherein said transducing means comprises a photo diode.

* * * * *